United States Patent
Blanc et al.

(10) Patent No.: US 6,717,932 B1
(45) Date of Patent: Apr. 6, 2004

(54) METHOD FOR SHARING CAPACITY IN A CDMA MOBILE RADIOCOMMUNICATION SYSTEM

(75) Inventors: Patrick Blanc, Issy les Moulineaux (FR); Rémi de Montgolfier, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/348,004

(22) Filed: Jul. 6, 1999

(30) Foreign Application Priority Data

Jun. 16, 1999 (EP) .............................. 99401487

(51) Int. Cl.⁷ .............................................. H04B 7/216
(52) U.S. Cl. ..................... 370/342; 370/320; 370/329; 370/335; 370/441; 455/450; 455/452.1; 455/453
(58) Field of Search ................................. 370/320, 328, 370/329, 335, 342, 431, 432, 441, 444, 447, 468; 455/450, 452.1, 453, 452.2

(56) References Cited

U.S. PATENT DOCUMENTS 5,224,120 A * 6/1993 Schilling ..................... 370/342
5,519,691 A * 5/1996 Darcie et al. ................ 370/335
5,596,576 A * 1/1997 Milito ......................... 370/468
5,794,140 A * 8/1998 Sawyer ....................... 455/453
5,892,769 A * 4/1999 Lee ............................ 370/447

FOREIGN PATENT DOCUMENTS

| EP | 0 831 669 A2 | 3/1998 |
| WO | WO 95/03652 | 2/1995 |

OTHER PUBLICATIONS

Mo–Han Fong et al.: "Concatenated Orthogonal/PN Spreading Scheme for Cellular DS–CDMA Systems with Integrated Traffic" Communications–Gateway to Globalization. Proceedings of the Conference on Communications, Seattle, Jun. 18–22, 1995, vol. 2, Jun. 18, 1995, pp. 905–909, XP000533131 Institute of Electrical and Electronics Engineers ISBN: 0–7803–2487–0.

* cited by examiner

*Primary Examiner*—Quochien B. Vuong
(74) *Attorney, Agent, or Firm*—Sughrue Mion, PLLC

(57) ABSTRACT

A method for shoring capacity in a code division multiple access mobile radiocommunication system, between a given number of users of said system, a method wherein said given number is predetermined, said method including a step of allocating code resources to said users, as a function of said predetermined number.

14 Claims, 3 Drawing Sheets

FIG_1
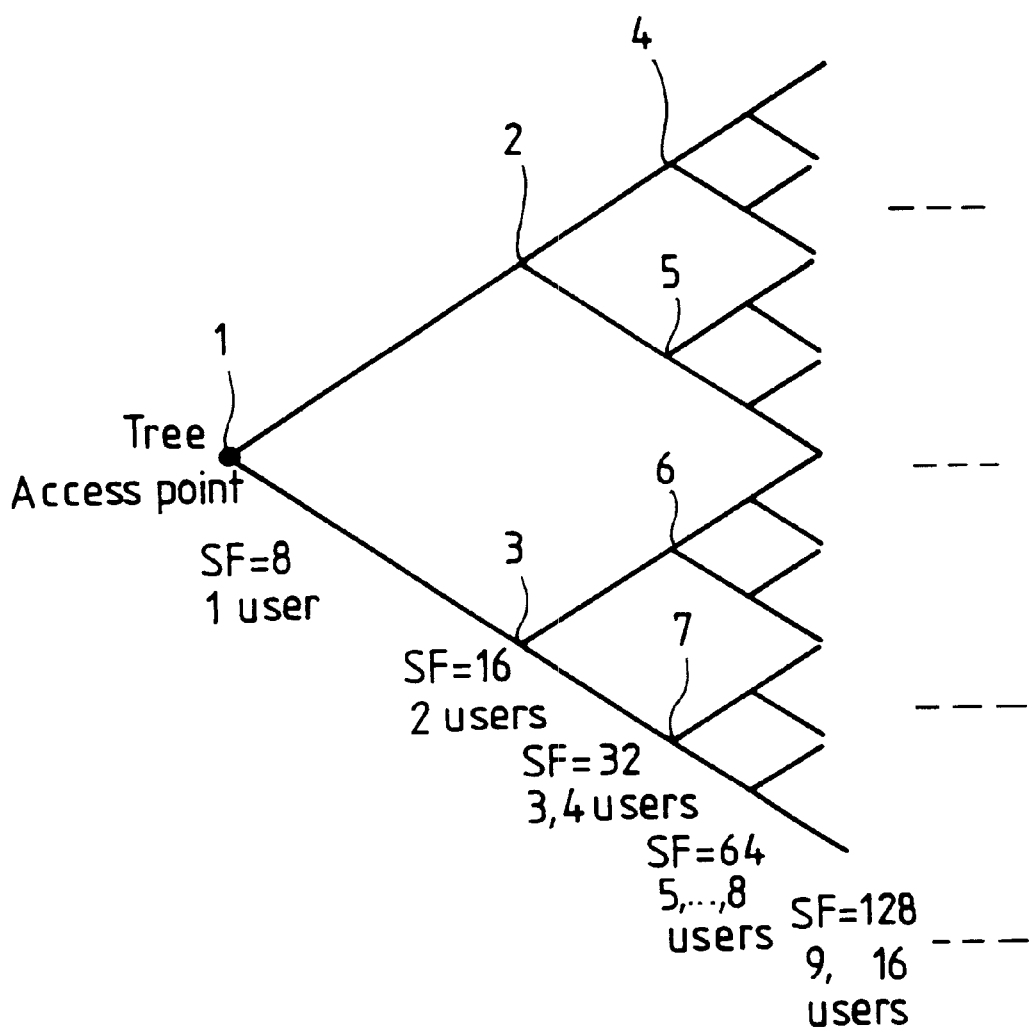

FIG_2
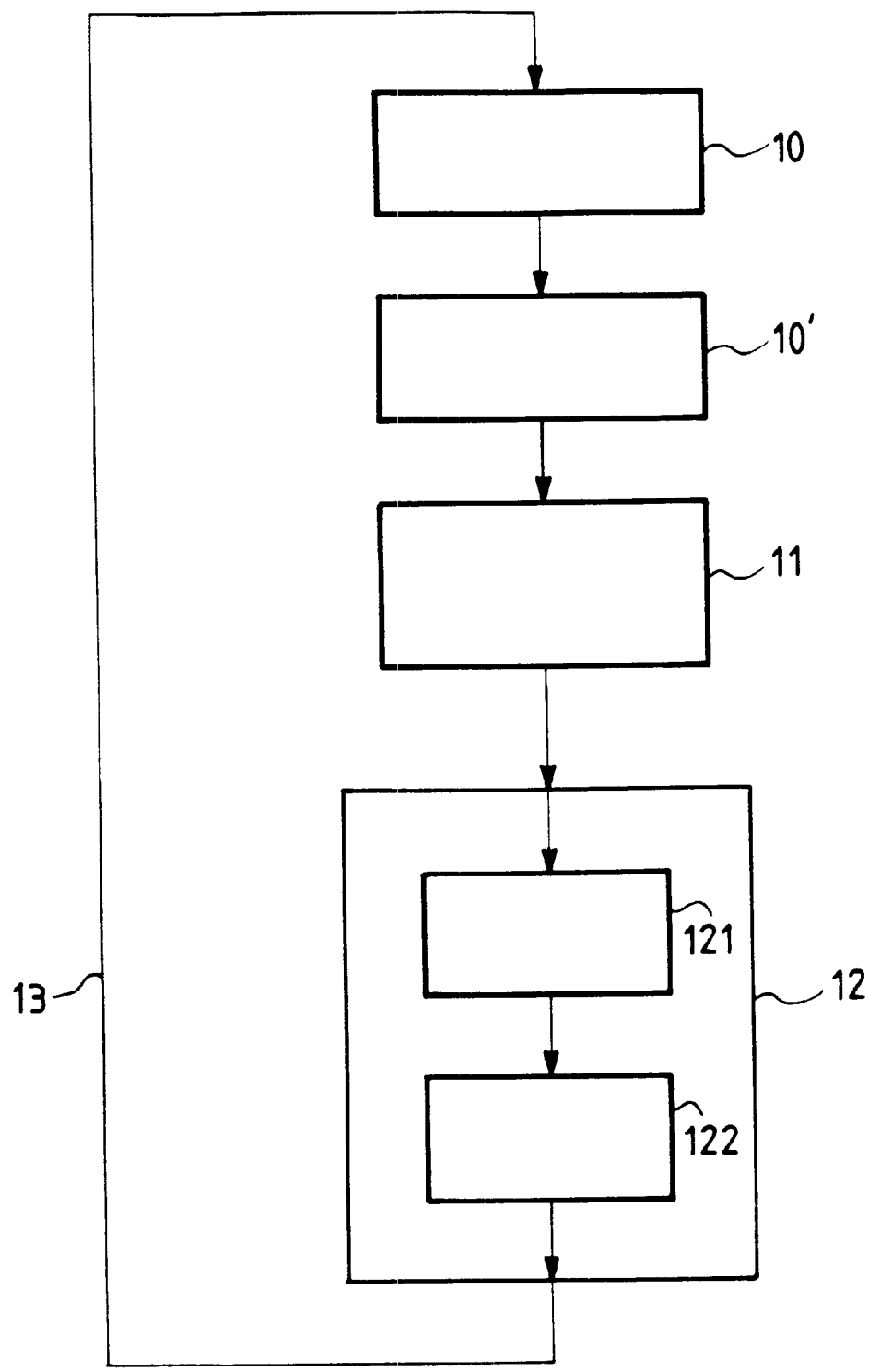

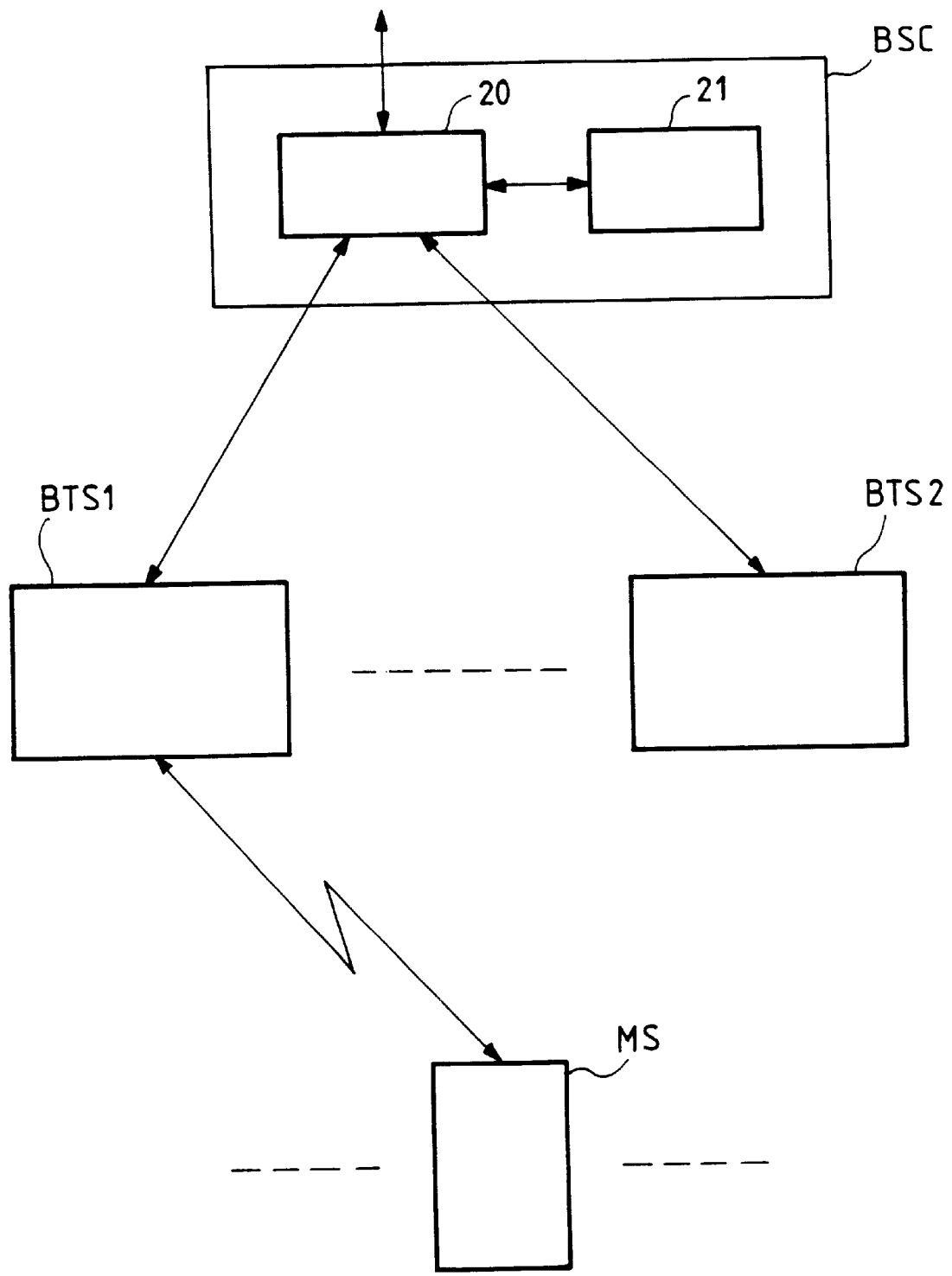
FIG_3

METHOD FOR SHARING CAPACITY IN A CDMA MOBILE RADIOCOMMUNICATION SYSTEM

BACKGROUND OF THE INVENTION

The present invention generally relates to mobile radiocommunication systems.

The present invention more particularly relates to CDMA ("Code Division Multiple Access") systems. In particular, the present invention is applicable to UMTS ("Universal Mobile Telecommunication Systems").

CDMA is a multiple access technique which makes it possible for several users to share a common bandwidth by allocating different codes to these different users.

Code allocation enables the transmission at a given transmission rate, or else at a given transmit power, all representing a portion of a system capacity.

In such systems, there is a general need to make the most efficient use of available radio resources, by allocating these resources to users, according to needs, in the most efficient way.

One way to optimise the use of radio resources is to take advantage of periods of low activity in high priority traffic (such as for example silence periods in voice traffic), to transmit low priority traffic (such as for example packet data traffic).

Such an optimisation may especially be beneficial for downlink transmission, i.e. for transmission from a fixed station, also called base station, to mobile stations, or users, served by this fixed station. In this way, a residual transmit power may be allocated for low priority traffic, as for as the sum of this residual transmit power and of the transmit power used for high priority traffic, at each instant, does not exceed the total transmit power available at the base station. This is disclosed for example in WO 98/35514.

A problem is how to share such a residual capacity between such low priority users. In the cited reference, this residual capacity is shared between such users (called scheduled users) on a priority basis. At each frame, a scheduled user having the highest priority is allocated a portion of the residual capacity, taking into account the capacity requirements for this user, then the residual capacity is updated to take into account the just allocated capacity. This is repeated for a next scheduled user of lower priority, and so on, each scheduled user thus getting a portion of said residual capacity then being allocated the corresponding required codes.

With such a solution, scheduled users having lower priorities may have to wait quite a long time before being served, depending on the number of more prioritary scheduled users, and on the amount of data to be transmitted to such more prioritary scheduled users.

The present invention is based on a different approach for sharing such a capacity between such users, enabling in particular to guarantee given number of users to be served at each instant. The present invention is not limited to the case where the thus shared capacity is a residual capacity as recalled above; the present invention may be applied to any case where it may be useful to share capacity in such a system, between a given number of users of this system.

SUMMARY OF THE INVENTION

An object of the present invention is therefore a method for sharing capacity in a code division multiple access mobile radiocommunication system, between a given number of users of said system, a method wherein said given number is predetermined, said method including a step of allocating code resources to said users, as a function of said predetermined number.

According to another object of this invention, said capacity corresponds to a residual downlink capacity, not used at a given instant for high priority traffic, and said users sharing said residual capacity correspond to low priority traffic users.

According to another object of this invention, said step of allocation of code resources to said users includes a first step, whereby code resources are allocated so that said capacity is evenly shared between said users.

According to another object of this invention, said step of allocation of code resources to said users includes a second step, whereby code resources thus allocated in said first step are adapted, so as to take into account the capacity requirements for each user.

According to another object of this invention, said second step includes
  a step of controlling if the sum of the capacities which would be allocated to said users, using the code resources thus allocated in said first step, and taking into account the different capacity requirements for each of said users, does not exceed said capacity,
  a step of adapting the code resources allocated to at least one of said users, if said sum exceeds said capacity, said adaptation being carried out in a way that said sum no longer exceeds said capacity.

According to another object of this invention, said allocation of code resources includes allocating to each of said users a code length required for sharing said capacity between said users.

According to another object of this invention, said first step includes allocating a some code length to each of said users.

According to another object of this invention, said method further includes a step of determining said given number of users.

According to another object of this invention, said given number of users is determined as a function of said capacity and of users' needs.

According to another object of this invention, said method further includes a step of dividing said users into different groups having respective priorities, and sharing said capacity between said different groups, according to said respective priorities.

According to another object of this invention, sharing said capacity between said different groups is carried out in the time domain.

According to another object of this invention, said sharing in the time domain is performed on a data unit period, or frame, basis.

According to another object of this invention, said steps are performed dynamically.

According to another object of this invention, said steps are performed on a data unit period, or frame, basis.

The present invention also has for its object a mobile radiocommunication network entity (such as base station and/or base station controller) for performing such a method.

BRIEF DESCRIPTION OF THE DRAWINGS

These and other objects of the present invention will become more apparent from the following description taken in conjunction with the accompanying drawings:

FIG. 1 is a diagram intended to illustrate an example of capacity sharing according to the present invention, FIG. 2 is a diagram intended to illustrate an example of a method according to the present invention, as applied to the above mentioned example of sharing of a residual downlink capacity, FIG. 3 is a diagram intended to illustrate the type of means which may be used in a mobile radiocommunication network entity to perform a method according to the present invention.

DETAILED DESCRIPTION OF THE INVENTION

FIG. 1 illustrates a tree-like structure, generally used for representing a mode of generation of variable length codes in variable rate CDMA systems, and which may be used to illustrate code resource allocation as a function of a predetermined number of users, according to the present invention.

In FIG. 1:

- node 1 (or root) of the tree corresponds to a code length SF equal to a minimum allowable code length noted "SF(tree-access-point)" (for example SF=8 in the illustrated example), or else to a transmission rate TR equal to a maximum allowable transmission rate TRmax, or else to a maximum number "n" of users shoring said capacity which would be equal to 1,
- nodes 2 and 3 of the tree each correspond to a code length SF equal to twice the minimum length "SF(tree-access-point)" (for example SF=16 in the illustrated example), or else to a transmission rate TR equal to TRmax/2, or else to a maximum number "n" of users equal to 2,
- nodes 4, 5, 6, 7 of the tree each correspond to a code length SF equal to four times the minimum length "SF(tree-access-point)" (for example SF=32 in the illustrated example), or else to a transmission rate TR equal to TRmax/4, or else to a maximum number of users "n" equal to 4, . . . etc.

In this way, code resources can be allocated as a function of a predetermined number "n" of users sharing said capacity, and therefore a predetermined number "n" of users sharing said capacity con be guaranteed at each instant.

FIG. 2 is a diagram intended to illustrate an example of a method according to the present invention, as applied to the above mentioned example of shoring of a residual downlink capacity.

The steps illustrated at FIG. 2 are performed at a given base station (i.e. for a given serving cell) and are repeated periodically, for example every data unit period, or frame.

The residual power may be estimated at each frame as follows:

$$P_{I,sh} = Pt_{tot,s} - P_{I,RT}$$

where:

$P_{I,sh}$ is the estimated residual power, to be shared between low priority traffic users, in the serving cell, $Pt_{tot,s}$ is the total allocated downlink power for the serving cell (which depends on the cell load in adjacent cells)

$P_{I,RT}$ is the power used for high priority traffic in the serving cell.

Such a residual power may be estimated according to known methods (such as for example as disclosed in the above cited reference).

In the example illustrated in FIG. 2, this residual power or capacity is shared between a predetermined number "n" of low priority traffic users according to the following steps.

In a first step noted 11, code resources are first allocated so that said residual capacity is equally shared between said users.

For example, referring to the example of code resource allocation illustrated in FIG. 1, a some code length SF is first allocated to each of said users according to this first step. This same code length may be determined as follows, as a function of said number "n":

$$SF = SF(\text{tree-access-point}) * 2^{E(\log_2(n-1))+1}$$

where "E" stands for "integar part", and where:

n (n≠1) is the number of users shoring said residual capacity

SF is the spreading factor, or length of the allocated code,

SF(tree-access-point) is the minimum allowable spreading factor, or code length, defining the maximum allowable transmission rate.

In a second step noted 12 the code resources thus determined in the first step 11 may be adopted so as to take into account the different capacity requirements for these different users.

In the illustrated example said second step 12 includes:

a step 121 of controlling if the sum of the capacities which would be allocated to said users, using the code resources determined in first step 11, and taking into account the different capacity requirements for each user, does not exceed the estimated residual capacity, a step 122 of adapting the code resources allocated to at least one of said users, if said sum exceeds said residual capacity, said adaptation being made so that said sum no longer exceeds said residual capacity.

The amount of power required by each user "i" depends on its quality requirement (which may be represented by its Signal-to-Interference ratio, or $SIR_i$) and on its allocated transmission rate (or Processing Gain PGi). As generally known, the following equation holds:

$$SIR_i = \frac{PG_i \cdot L_{i,N} \cdot Pt_{i,s}}{\alpha \cdot L_{i,N} \cdot (Pt_{tot,N} - Pt_{i,s}) + \sum_{N=S} L_{i,n} \cdot Pt_{tot,n} + N}$$

where:

$SIR_i$ is the $E_b$ over No ratio (or energy-per-bit-to-noise ratio) for user "i"

PGi is the processing gain for user "i" (depending on the allocated code resource)

$L_{i,s}$ is the path-loss between the serving base station $BTS_s$ and user "i"

$L_{i,n}$ is the path-loss between base station $BTS_n$ and user "i"

$Pt_{i,s}$ is the transmit power of the serving base station for user "i"

$Pt_{tot,s}$ is the total transmit power of the serving base station $BTS_s$ $Pt_{tot,n}$ is the total transmit power of base station $BTS_n$ α is the orthogonality factor in the serving cell N is the noise level in the receiver bandwidth for user "i"

The power $Pt_{i,s}$ allocated to each user "i" is then defined as:

$$Pt_{i,s} = \frac{\alpha \cdot Pt_{tot,s} + \left(\sum_{N=S} L_{i,n} \cdot Pt_{tot,n} + N\right) / L_{i,n}}{PG_i / SIR_i + \alpha}$$

Step 121 may then be performed by determining if the following condition is met:

$$\sum_i Pt_{i,s} < P_{i,sh}$$

If this condition is not met, in step 122 the code resources (and then the processing gain PGi) allocated to at least one user "i" are adapted, in a way that said sum no longer exceeds said residual capacity.

In the example of FIG. 1, adapting the code resources for user "i" would include increasing the spreading factor, or code length, SFi, allocated to this user.

The user(s) for whom the spreading factor would thus be increased (or equivalently the transmission rote would be reduced, or equivalently the transmit power would be reduced) would for example be those experiencing the worst environment conditions (i.e. those requiring the highest transmit power, for a some transmission rate).

Therefore, at the end of second step 12, the same code length, and therefore the some transmission rate, is not necessarily allocated to each user, depending on the capacity requirements of each user.

Besides, the number "n" of users may be dynamically determined, as illustrated by a step 10', for example as a function of the available residual capacity, and of traffic needs.

Besides, low priority traffic users sharing this residual capacity may further be divided into different groups having respective priorities, and the residual capacity further shared between these different groups according to these respective priorities.

In particular, such a further sharing may be carried out in the time domain. For example, in the case of two groups, a first group being more prioritary than a second one, the second group could be served for example every three frames, and the first group at the other frames.

Low priority traffic users may for example be divided into such groups according to the various required transmission rates.

Therefore, in the example illustrated in FIG. 2, in a step noted 10 the group to be served at the current frame is determined accordingly, and code resources allocation as performed in steps 11 and 12 applies to the users of the thus determined group.

Steps 10, 10', 11 and 12 are repeated periodically, for example on a frame basis, as illustrated by loop 13 in FIG. 2.

FIG. 3 is a diagram intended to illustrate the type of means which may be used in a mobile radiocommunication network entity to perform a method according to the present invention.

As generally known, a mobile radiocommunication system comprises mobile stations such as the one noted MS, and a mobile radiocommunication network in turn comprising at least one base station, such as the ones noted BTS1, BTS2, and at least one base station controller such as the one noted BSC.

Means for performing a method according to the present invention may advantageously be provided in a base station controller.

A base station controller therefore comprises, besides other means which are not recalled here and which may be classical:

means 20 for communicating on one side with an entity of higher level of said network (such as a mobile switching center, not illustrated) and on the other side with at least one mobile station via at least one base station (such communication being carried out according to known communication procedures, or protocols, in such systems)

means 21 for sharing a downlink residual transmit power not used at each frame by high priority traffic users (in particular voice traffic users), between low priority traffic users (in particular data packet traffic users).

Means 21 may for example operate according to the method disclosed in FIG. 2.

Means 21 may therefore receive the various parameters required to perform the different steps of the above disclosed method, i.e.:

parameters required for performing said first step:
  parameter "n" (number of low priority traffic users sharing sold residual capacity), which may be determined according to various factors such as for example the estimated downlink residual capacity and traffic needs at each instant,
  parameter "SF(tree-access-point)", which may be determined according to the downlink residual capacity $P_{I,sh}$ estimated at each instant, parameters required for performing said second step:
  parameters such as $\alpha$, $Pt_{tot,s}$, $P_{tot,n}$, $L_{i,s}$, $L_{i,n}$ and N, which may be predetermined parameters,
  parameter $SIR_i$, which may already have to be estimated at the users' side for downlink power control, and which may then be signalled to the base station controller by the corresponding mobile station,
  parameter PGi, which depends on the spreading factor, or code length, allocated to user "i".

The code resources allocated to each user, as determined by means 21, may be signalled to the corresponding mobile station and base station(s) according to known signalling procedures or protocols in such systems.

What is claimed is:

1. A method for sharing a portion of downlink capacity in a code division multiple access mobile radio communications system between a given number of users of the system, a method wherein said given number is predetermined, said method including a step of:
   allocating code resources to said users, as a function of said predetermined number and said portion of said downlink capacity.

2. A method according to claim 1, wherein said capacity corresponds to a residual downlink capacity, not used at a given instant for high priority traffic, and said users sharing said residual capacity correspond to low priority traffic users.

3. The method according to claim 1, further comprising:
   a step of controlling a sum of the capacities which would be allocated to said users, using the allocated code resources, and taking into account the different capacity requirements for each of said users, such that the sum does not exceed a maximum capacity,
   a step of adapting the code resources allocated to at least one of said users, if said sum exceeds said maximum capacity, said adaptation being carried out in a way that said sum no longer exceeds said maximum capacity.

4. A method according to claim 1, wherein said step of allocation of code resources includes allocating to each of said users a code length required for sharing said capacity between said users.

5. The method according to claim 1, wherein a same code length is allocated to each of said users.

6. A method according to claim 1, further including a step of determining said given number of users.

7. A method according to claim 6, wherein said given number of users is determined as a function of said capacity and of users' needs.

8. A method according to claim 1, wherein said method further includes a step of dividing said users into different groups having respective priorities, and sharing said capacity between said different groups, according to said respective priorities.

9. A method according to claim 8, wherein sharing said capacity between said different groups of users is carried out in the time domain.

10. A method according to claim 9, wherein said sharing in the time domain is performed on a data unit period, or frame, basis.

11. The method according to claim 1, wherein said step is performed dynamically.

12. The method according to claim 1, wherein said steps are performed on a data unit period, or frame, basis.

13. A code division multiple access mobile radio communication network entity, comprising:

means for sharing capacity between a predetermined number of users, said means for sharing comprises:

means for allocating code resources to said users as a function of said predetermined number so that said capacity is evenly shared between said users; and means for adapting said code resources allocated by said means for allocating, so as to take into account capacity requirements for each of said users.

14. The entity of claim 13, wherein said means for adapting controls, if a sum of the capacities which would be allocated to said users does not exceed said capacity, using the allocated code resources, and takes into account the different capacity requirements for each of said users, and said means for adapting adapts the code resources allocated to at least one of said users when said sum exceeds said capacity, wherein said adapting is performed such that said sum no longer exceeds said capacity.

* * * * *